(12) United States Patent
Lincoln

(10) Patent No.: US 11,062,586 B2
(45) Date of Patent: Jul. 13, 2021

(54) METHOD OF MONITORING HEALTH OF PROTECTIVE COVER OF DETECTION DEVICE

(71) Applicant: Carrier Corporation, Palm Beach Gardens, FL (US)

(72) Inventor: David L. Lincoln, Johnston, RI (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/619,357

(22) PCT Filed: Jun. 4, 2018

(86) PCT No.: PCT/US2018/035874
§ 371 (c)(1),
(2) Date: Dec. 4, 2019

(87) PCT Pub. No.: WO2018/226593
PCT Pub. Date: Dec. 13, 2018

(65) Prior Publication Data
US 2020/0193795 A1    Jun. 18, 2020

Related U.S. Application Data

(60) Provisional application No. 62/515,039, filed on Jun. 5, 2017.

(51) Int. Cl.
G08B 23/00    (2006.01)
G08B 21/18    (2006.01)
G01N 21/51    (2006.01)

(52) U.S. Cl.
CPC ........... *G08B 21/182* (2013.01); *G01N 21/51* (2013.01); *G01N 2201/061* (2013.01)

(58) Field of Classification Search
CPC . G08B 21/182; G01N 21/51; G01N 2201/061
See application file for complete search history.

(56) References Cited

U.S. PATENT DOCUMENTS 5,812,270 A * 9/1998 Hampton ............... G01B 11/00
                                                    356/237.1
7,075,445 B2   7/2006 Booth et al.
(Continued)

FOREIGN PATENT DOCUMENTS

| CN | 204007671 U | 12/2014 |
| DE | 102013002859 A1 | 8/2014 |

(Continued)

OTHER PUBLICATIONS

Bosch, "FCP-500 Series, Flush Mount Smoke Detectors," Bosch Security Systems, Bosch Commercial-Brochure, Aug. 2014, pp. 1-6.

(Continued)

*Primary Examiner* — Phung Nguyen
(74) *Attorney, Agent, or Firm* — Cantor Colburn LLP (57) ABSTRACT

A monitoring system for monitoring a condition of a substantially transparent component includes a light assembly operably coupled to the substantially transparent component. The light assembly is operable to selectively illuminate the substantially transparent component. At least one sensor is operably coupled to the substantially transparent component. The at least one sensor has a corresponding detection sensing volume. The at least one sensor is configured to measure the illumination of the substantially transparent component to determine a condition of the substantially transparent component.

17 Claims, 5 Drawing Sheets

(56) References Cited

U.S. PATENT DOCUMENTS

| | | | |
|---|---|---|---|
| 7,256,883 | B2 | 8/2007 | Detinkin et al. |
| 7,746,239 | B2 | 6/2010 | Nagashima |
| 7,869,171 | B2 * | 1/2011 | Weeks ............... H01R 13/7135 361/42 |
| 7,940,190 | B2 | 5/2011 | Penney |
| 7,948,617 | B2 * | 5/2011 | Shubinsky ............ G01N 21/94 356/237.1 |
| 7,978,087 | B2 | 7/2011 | Siber et al. |
| 2002/0011570 | A1 | 1/2002 | Castleman |
| 2002/0080040 | A1 * | 6/2002 | Schneider ........... G08B 29/043 340/628 |
| 2006/0012783 | A1 | 1/2006 | Flaig |
| 2010/0289650 | A1 * | 11/2010 | Dittmer ............... G08B 29/043 340/578 |
| 2011/0221889 | A1 * | 9/2011 | Knox ................... G08B 17/107 348/135 |
| 2013/0176131 | A1 | 7/2013 | Pichard et al. |
| 2015/0170489 | A1 | 6/2015 | Mittleman et al. |
| 2015/0371515 | A1 | 12/2015 | Zribi et al. |
| 2016/0086468 | A1 | 5/2016 | Calvert |
| 2016/0343226 | A1 | 11/2016 | Fischer et al. |

FOREIGN PATENT DOCUMENTS

| | | |
|---|---|---|
| EP | 1039426 A2 | 9/2000 |
| EP | 2472250 A1 | 7/2012 |
| WO | 2015151502 A1 | 10/2015 |

OTHER PUBLICATIONS http://safety108.blogspot.com/2011/09/924-light-scatter-type.html; "Light Scatter Type Smoke Detector"; Published Sep. 16, 2011.

International Search Report; PCT/US2018/035874; ISA/EP; dated Aug. 21, 2018.

European Office Action; International Application No. 18738027.4-1206; International Filing Date: Jan. 3, 2020; dated Sep. 21, 2020; 5 pages.

International Search Report of the International Searching Authority; International Application No. PCT/US2018/035874; International Filing Date: Jun. 4, 2018; dated Aug. 21, 2018; 5 pages.

Written Opinion of the International Searching Authority; International Application No. PCT/US2018/035874; International Filing Date: Jun. 4, 2018; dated Aug. 21, 2018; 10 pages.

* cited by examiner

METHOD OF MONITORING HEALTH OF PROTECTIVE COVER OF DETECTION DEVICE

CROSS-REFERENCE TO RELATED APPLICATIONS

This application is a 371 U.S. National Stage application of PCT/US2018/035874, filed Jun. 4, 2018, which claims the benefit of U.S. Provisional Application No. 62/515,039, filed Jun. 5, 2017, both of which are incorporated by reference in their entirety herein.

BACKGROUND OF THE INVENTION

The subject matter disclosed herein relates to detection systems, and more specifically, to a method for evaluating a condition of a detection device of the detection system using scattered light principles.

Smoke sensors, such as commercial smoke sensors, often located inside of a housing or enclosure, use near infrared light, or light of other wavelengths, scattering inside a plastic chamber located inside of the enclosure, with inlets of controlled dimensions to prevent entry of unwanted particles. However, some unwanted airborne particles do make their way into the chamber, causing false alarms. Over time, these particles may also collect at the inlets of the sensor chamber, making it more difficult for smoke particles to diffuse into the chamber. Additionally, particles collecting on chamber surfaces may increase sensitivity, thereby resulting in more frequent false or nuisance alarms.

BRIEF DESCRIPTION OF THE INVENTION

According to one aspect of the invention, a monitoring system for monitoring a condition of a substantially transparent component includes a light assembly operably coupled to the substantially transparent component. The light assembly is operable to selectively illuminate the substantially transparent component. At least one sensor is operably coupled to the substantially transparent component. The at least one sensor has a corresponding detection sensing volume. The at least one sensor is configured to measure the illumination of the substantially transparent component to determine a condition of the substantially transparent component.

In addition to one or more of the features described above, or as an alternative, in further embodiments the light assembly further comprises at least one light source.

In addition to one or more of the features described above, or as an alternative, in further embodiments the light assembly further comprises at least one light transmission device for communicating light emitted from the at least one light source to the substantially transparent component.

In addition to one or more of the features described above, or as an alternative, in further embodiments the light transmission device is a light pipe.

In addition to one or more of the features described above, or as an alternative, in further embodiments the light assembly is oriented such that light is emitted the at least one light source in a plane generally parallel to the surface of the substantially transparent component.

In addition to one or more of the features described above, or as an alternative, in further embodiments the light assembly is oriented such that light is emitted from the at least one light source at one or more angles to a plane of the substantially transparent component.

In addition to one or more of the features described above, or as an alternative, in further embodiments the at least one sensor comprises a light sensing device.

In addition to one or more of the features described above, or as an alternative, in further embodiments the substantially transparent component is a cover of a detection apparatus.

In addition to one or more of the features described above, or as an alternative, in further embodiments the detection apparatus further comprises at least one light source and the at least one light source being operable as a part of the light assembly.

In addition to one or more of the features described above, or as an alternative, in further embodiments the detection apparatus further comprises at least one light sensing device operable as the at least one light sensing device of the monitoring system.

In addition to one or more of the features described above, or as an alternative, in further embodiments comprising a processing device in communication with the light assembly and the at least one sensor, wherein the processing device is configured to intermittently operate the light assembly, store measurements from the at least one sensor, and compare a current reading of the plurality of sensors to the stored measurements.

According to another embodiment, a method of operating a monitoring system includes establishing at least one baseline measurement of light transmission of a substantially transparent component, establishing at least one updated measurement of light transmission of the substantially transparent component, and comparing the at least one updated measurement to the at least one baseline measurement to determine a condition of the substantially transparent component.

In addition to one or more of the features described above, or as an alternative, in further embodiments establishing at least one baseline measurement comprises illuminating the substantially transparent component.

In addition to one or more of the features described above, or as an alternative, in further embodiments illuminating the cover further comprises intermittently operating a light source of a light assembly operably coupled to the cover.

In addition to one or more of the features described above, or as an alternative, in further embodiments the light source is intermittently operated to create a burst of light.

In addition to one or more of the features described above, or as an alternative, in further embodiments establishing at least one baseline measurement further comprises operating at least one light sensing device to detect and measure light emitted from the substantially transparent component to establish the baseline measurement.

In addition to one or more of the features described above, or as an alternative, in further embodiments comparing the at least one updated measurement to the at least one baseline measurement further comprises operating a processing device to determine a difference in the at least one updated measurement the at least one baseline measurement.

In addition to one or more of the features described above, or as an alternative, in further embodiments comprising operating the processing device to compare the difference in the at least one updated measurement the at least one baseline measurement to a threshold.

In addition to one or more of the features described above, or as an alternative, in further embodiments if the difference is less than the threshold, establishing at least one updated measurement for the plurality of sensing volumes is repeated.

In addition to one or more of the features described above, or as an alternative, in further embodiments if the difference is exceeds the threshold, a warning signal is generated indicating that maintenance of the cover is required.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Referring now to the FIGS., a detection apparatus 20 for detecting one or more conditions or events within a designated area is illustrated. In the illustrated, non-limiting embodiment, the detection apparatus 20 is a chamber-less smoke detector. It will be appreciated that a chamber-less smoke detector may provide additional benefits including, but not limited to reduction of transport time for smoke to reach the sensor elements to enable faster response/alarm times, improved sensitivity, manufacturability, and reproducibility, negligible directionality, each of maintenance, and enhanced aesthetics for example. However, it should be understood that in other embodiment, the detection apparatus 20 may be able to detect one or more hazardous conditions, including but not limited to the presence of smoke, fire, temperature, flame, or any of a plurality of pollutants, combustion products, or chemicals. Alternatively, or in addition, the detection apparatus 20 may be configured to perform monitoring operations of people, lighting conditions, or objects. In an embodiment, the detection apparatus 20 may operate in a manner similar to a motion sensor, such as to detect the presence of a person, occupants, or unauthorized access to the designated area for example. The conditions and events described herein are intended as an example only, and other suitable conditions or events are within the scope of the disclosure.

The detection apparatus 20 uses light to evaluate a volume for the presence of a condition. In this example, light is emitted into the designated area; when the light encounters an object (a person, smoke particle, or gas molecule for example), the light is scattered and/or absorbed due to a difference in the refractive index of the object compared to the surrounding medium (air). Observing any changes in the incident light can provide information about the designated area including determining the presence of a predetermined condition or event.

Figure 1:
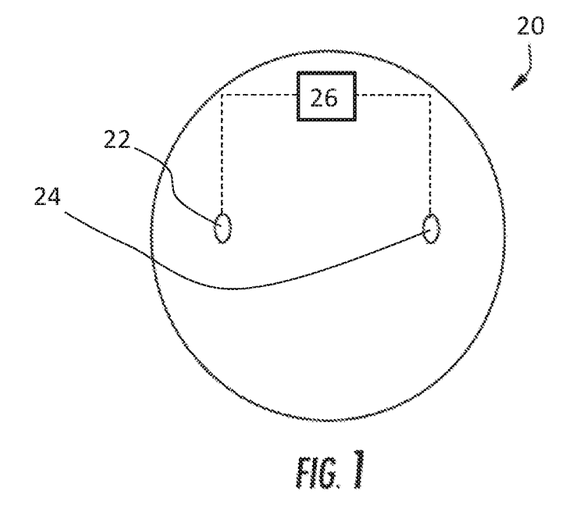
FIG. 1 is a schematic diagram of a detection apparatus according to an embodiment.

In its most basic form, as shown in FIG. 1, the detection apparatus 20 includes a light source 22, such as a light emitting diode (LED) for example, and a light sensing device 24, such as a photodiode for example. However, embodiments including a plurality of light sources and/or a plurality of light sensing devices 24 are also contemplated herein. A processing device 26 is arranged in electrical communication with the at least one light source and the at least one light sensing device. The processing device 26 includes a memory (not shown) capable of storing executable instructions. The executable instructions may be stored or organized in any manner and at any level of abstraction, such as in connection with one or more applications, processor, or routines, to analyze the signals detected by the plurality of sensors to make alarm decisions after preset threshold levels are reached according to the method described herein.

An example of a detection apparatus 20 as illustrated and described herein and a method of operating the detection apparatus 20 to detect the presence of a condition or event, such as smoke for example, is set forth in U.S. Provisional Patent Application Ser. No. 62/397,972 filed on Sep. 22, 2106, the entire contents of which is included herein by reference.

Figure 2:
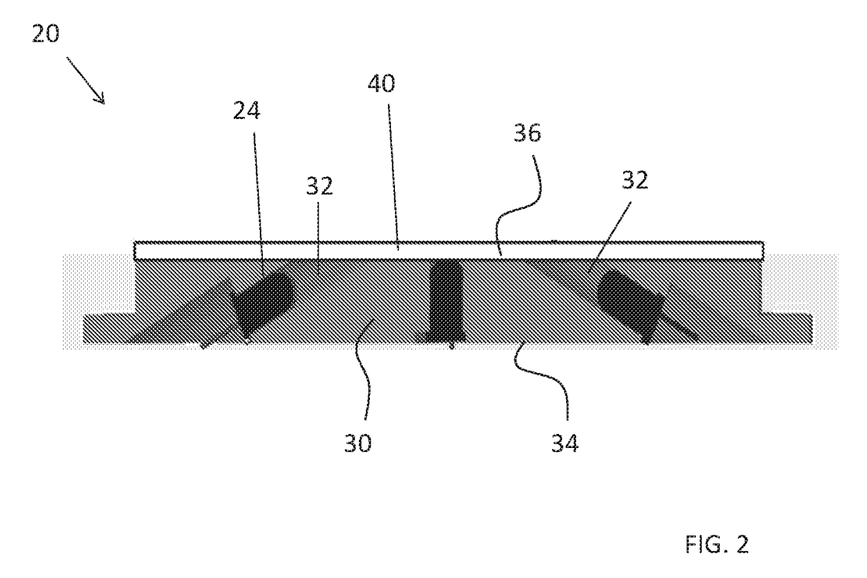
FIG. 2 is a side view of a detection apparatus according to an embodiment.

With reference now to FIG. 2, a cross-sectional view of the detection apparatus 20 is illustrated. As shown, the detection apparatus 20 further comprises a body or casing 30 having at least one channel 32 formed therein. The one or plurality of channels 32 extend generally from a first surface 34 of the body 30 to a second, opposite surface 36 of the body 30. The first surface 34 of the body 30 is typically positioned adjacent a supporting surface, such as a wall or ceiling for example, and the second surface 36 of the body 30 is typically arranged in communication with an area being monitored to determine the existence of a condition or event. Each of the one or more light sensing devices 24 is positioned within a corresponding channel 32 to receive light such that the portion of the at least one light sensing device 24 configured to receive a light signal is facing the second surface 36 and the area to be monitored. Although not shown, the at least one light source 22 may be similarly mounted within the body 30 of the detection apparatus 20.

In the illustrated, non-limiting embodiment, a cover or lens 40 is arranged in overlapping arrangement with the second surface 36 of the body 30 of the detection apparatus 20. The cover 40 is configured to encapsulate the second surface 36 of the body 30, thereby protecting the at least one light source 22 and the at least one light sensing device 24 from damage or other conditions that may negatively impact operation of the detection apparatus 20, including but not limited to, dust, debris, smudges and scratches for example. In embodiments where the detection apparatus 20 relies on optics to detect the existence of a condition or event in the area being monitored, the cover 40 is substantially transparent.

Although the cover 40 protects the interior of the detection apparatus 20 from conditions that may negatively impact operation of the detection apparatus, the exterior surface of the cover remains susceptible to such conditions. Accordingly, it is therefore beneficial to be able to monitor the condition or health of the cover 40 to maintain a desired operational sensitivity of the detection apparatus 20. In an embodiment, the detection apparatus 20 further comprises a cover monitoring system 50, best shown in FIGS. 3 and 4.

Figure 3:
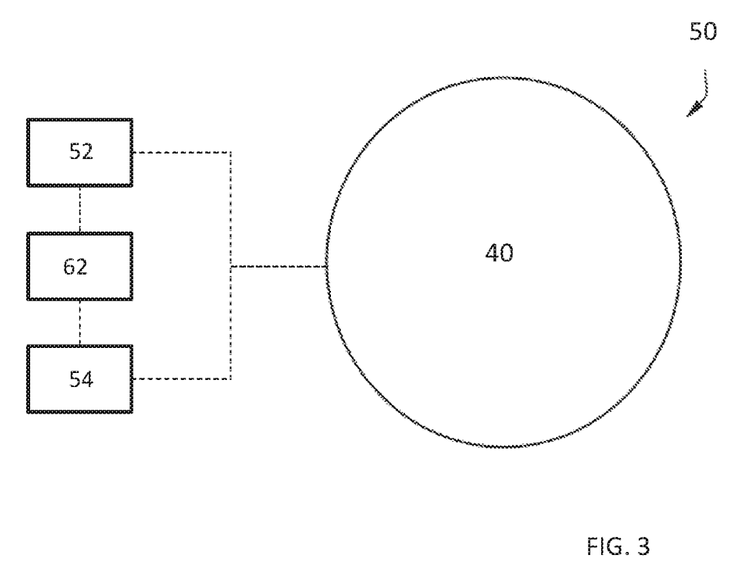
FIG. 3 is a schematic diagram of a cover monitoring system according to an embodiment.
Figure 4:
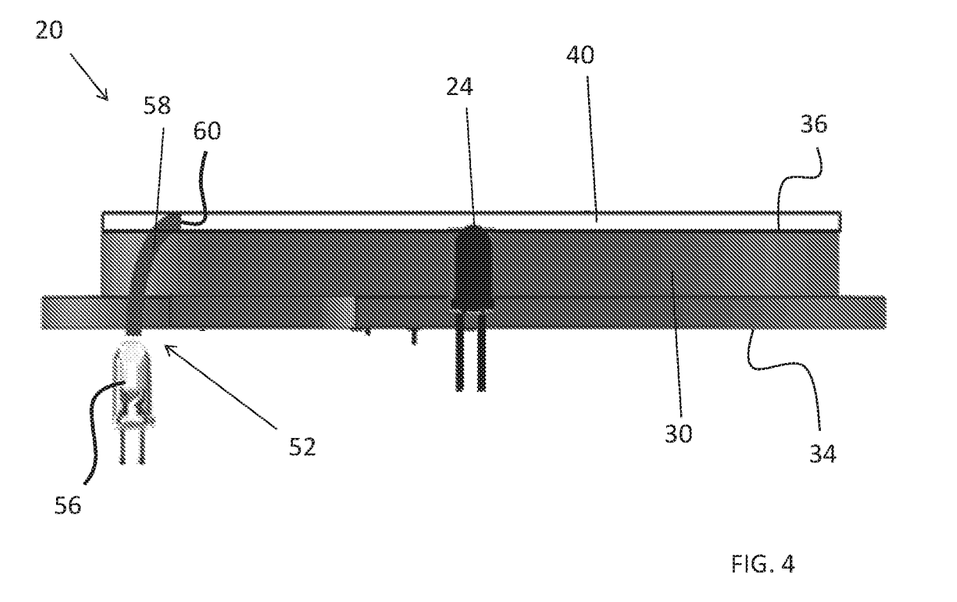
FIG. 4 is a side view of a detection apparatus including a cover monitoring system according to an embodiment.

The cover monitoring system 50 may be able to monitor the health of the cover 40 by illuminating the cover 40 and then evaluating the scattered light signals received from the cover 40. Although the cover monitoring system 50 is illustrated and described herein with respect to a detection apparatus 20, it should be understood that the cover monitoring system 50 is suitable for use in other applications.

With reference now to FIGS. 3 and 4, an example of a cover monitoring system 50 is illustrated in more detail. The cover monitoring system 50 includes a light assembly 52 for illuminating the cover 40 of the detection apparatus 20 and one or more light sensing devices 54 for detecting the light of the illuminated cover 40. Each of the one or more light sensing devices 54 has a corresponding detection sensing volume associated therewith. As shown in more detail in FIG. 4, the light assembly 52 includes one or more light sources 56, such as a light emitting diode for example, coupled to cover 40 at a position offset from a center of the cover 40. It should be understood that other suitable light sources are also contemplated herein. In an embodiment, the at least one light source 22 of the detection apparatus 20 is operable as the light source 56 of the cover monitoring system 50. However, in other embodiments, the at least one light source 22 of the detection apparatus 20 and the one or more light sources 56 of the cover monitoring system 50 are separate and distinct. In addition, it should be understood that the at least one light sensing device 24 may, but need not be configured to function as the one or more light sensing devices 54 of the cover monitoring system 50.

Light emitted from the light source 56 is communicated to the cover 40 via a light transmission device 58, such as a fiber optic cable or a light pipe for example. In an embodiment, the light transmission device 58 is oriented such that the light emitted from the outlet end 60 thereof extends generally parallel to the plane of the cover 40. However, a light assembly 52 arranged at another angle relative to the cover 40 is also within the scope of the disclosure. Further, in embodiments including a plurality of light sources 56, the plurality of light sources 56 may be configured to introduce light into the cover 40 at multiple angles. By positioning the outlet 60 of the one or more light transmission devices 56 generally adjacent an exterior edge of the cover 40, the light from the light assembly 52 is transmitted across the substantial entirety of the cover 40.

In an embodiment, the light assembly 52 additionally includes a second light transmission device (not shown) operably coupled to the light sensing device 54 of the cover monitoring system 50, or alternatively to the at least one light sensing device 24 of the detection apparatus. As a result of this configuration, the light sensing device 54 or 24 is operable to detect when the light source 54 is inoperable or in need or maintenance.

The light emitted from the light transmission device 56 oriented generally parallel to the planar surface of the cover 40 intersects the sensing detection volume of the at least one light sensing device 54. Accordingly, the light sensing device 54 can be used to evaluate a change in the scattered signal incident on the light sensing device 54 over time.

Figure 5:
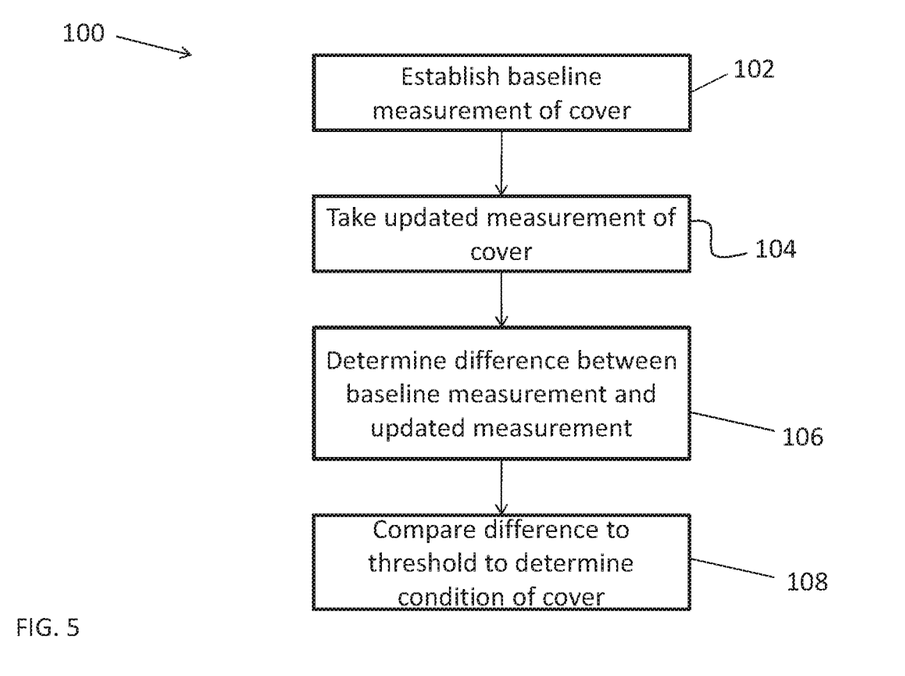
FIG. 5 is a method of determining a condition of the cover of the detection apparatus according to an embodiment.

A processing device 62 of the cover monitoring system 50 may be operable to run an algorithm including a method 100 of evaluating the condition of the cover 40 of the detection apparatus 20, as shown in FIG. 5. In an embodiment, the processing device 26 of the detection apparatus is operable as the processing device 62 of the cover monitoring system 50. However, embodiments exist where the processing devices 26 and 52 are distinct. The method 100 includes establishing a baseline measurement for the one or more light sensing devices 54 during illumination of the cover 40, as shown in block 102. Establishing a baseline measurement includes operating the light source 56 of the light assembly 52 to emit a light across the cover 40 of the detection apparatus 20. The light source 56 may be operable to emit the light as a burst, or alternatively, as a pattern of emissions. The at least one light sensing device 54 detects and measures the scattered light resulting from operation of the light assembly 52 for each detection sensing volume, respectively. The scattered light sensed at each detection sensing volume may be stored individually, or alternatively, may be combined to create and store at least one baseline measurement associated with the cover 40.

In block 104, the cover monitoring system 50 may operate periodically to take an updated measurement of the scattered light that results from operation of the light assembly 52. Operation of the light assembly 52 to record an updated measurement of the scattered light and evaluate the condition of the cover 40 may occur at predetermined intervals, or alternatively, in response to the occurrence of an abnormality during the normal monitoring performed by the detection apparatus 20.

The method 100 further includes comparing the updated measurement of the scattered light resulting from illumination of the cover 40 with the baseline measurement associated with the cover 40, as shown in block 106, and determining whether the updated measurement is within an acceptable threshold, as shown in block 108. If the updated measurement or a corresponding electrical characteristic associated therewith is within an acceptable threshold, the steps in blocks 104-108 are repeated. If the difference between the updated measurement and the baseline measurement exceeds the threshold, the processor 30 may generate warning signal or message to indicate that condition of the cover 40 is affecting the sensitivity of the detection apparatus 20 and that maintenance of the cover 40 is therefore required.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A monitoring system for monitoring a condition of a substantially transparent component comprising:
   a light assembly operably coupled to the substantially transparent component, the light assembly being operable to selectively illuminate the substantially transparent component, wherein the light assembly is oriented such that light is emitted by the at least one light source in a plane generally parallel to a surface of the substantially transparent component;
   at least one sensor operably coupled to the substantially transparent component, the at least one sensor having a corresponding detection sensing volume, wherein the at least one sensor is configured to measure the illumination of the substantially transparent component to determine a condition of the substantially transparent component.

2. The monitoring system of claim 1, wherein the light assembly further comprises at least one light source.

3. The monitoring system of claim 2, wherein the light assembly further comprises at least one light transmission device for communicating light emitted from the at least one light source to the substantially transparent component.

4. The monitoring system of claim 3, wherein the light transmission device is a light pipe.

5. The monitoring system of claim 1, wherein the at least one sensor comprises a light sensing device.

6. The monitoring system of claim 1, wherein the substantially transparent component is a cover of a detection apparatus.

7. The monitoring system of claim 6, wherein the detection apparatus further comprises at least one light source and the at least one light source being operable as a part of the light assembly.

8. The monitoring system of claim 6, wherein the detection apparatus further comprises at least one light sensing device operable as the at least one light sensing device of the monitoring system.

9. The monitoring system of claim 1, further comprising a processing device in communication with the light assembly and the at least one sensor, wherein the processing device is configured to intermittently operate the light assembly, store measurements from the at least one sensor, and compare a current reading of the at least one light sensing device to the stored measurements.

10. A method of operating a monitoring system, the method comprising:
    establishing at least one baseline measurement of light transmission of a substantially transparent component including illuminating the substantially transparent component by emitting light in a plane generally parallel to a surface of the substantially transparent component;
    establishing at least one updated measurement of light transmission of the substantially transparent component; and
    comparing the at least one updated measurement to the at least one baseline measurement to determine a condition of the substantially transparent component.

11. The method of claim 10, wherein illuminating the cover further comprises intermittently operating a light source of alight assembly operably coupled to the substantially transparent component.

12. The method of claim 11, wherein the light source is intermittently operated to create a burst of light.

13. The method of claim 10, wherein establishing at least one baseline measurement further comprises operating at least one light sensing device to detect and measure light emitted from the substantially transparent component to establish the baseline measurement.

14. The method of claim 10, wherein comparing the at least one updated measurement to the at least one baseline measurement further comprises operating a processing device to determine a difference in the at least one updated measurement the at least one baseline measurement.

15. The method of claim 14, further comprising operating the processing device to compare the difference in the at least one updated measurement the at least one baseline measurement to a threshold.

16. The method of claim 15, wherein if the difference is less than the threshold, establishing at least one updated measurement for the plurality of sensing volumes is repeated.

17. The method of claim 15, wherein if the difference exceeds the threshold, a warning signal is generated indicating that maintenance of the substantially transparent component is required.

* * * * *